(12) United States Patent
Oldani et al.

(10) Patent No.: US 7,828,941 B2
(45) Date of Patent: Nov. 9, 2010

(54) DISTRIBUTING ELEMENT FOR ELECTROLYTE PERCOLATION ELECTROCHEMICAL CELL

(75) Inventors: Dario Oldani, Milan (IT); Antonio Pasquinucci, S. Giuliano Milanese (IT)

(73) Assignee: Industrie de Nora S.p.A., Milan (IT)

( * ) Notice: Subject to any disclaimer, the term of this patent is extended or adjusted under 35 U.S.C. 154(b) by 919 days.

(21) Appl. No.: 10/514,830

(22) PCT Filed: May 30, 2003

(86) PCT No.: PCT/EP03/05709

§ 371 (c)(1),
(2), (4) Date: Nov. 12, 2004

(87) PCT Pub. No.: WO03/102271

PCT Pub. Date: Dec. 11, 2003

(65) Prior Publication Data

US 2005/0183951 A1    Aug. 25, 2005

(30) Foreign Application Priority Data

Jun. 4, 2002    (IT) .......................... MI2002A1203

(51) Int. Cl.
  $C25B\ 9/20$    (2006.01)
  $C25B\ 1/26$    (2006.01)
(52) U.S. Cl. ........................ 204/258; 204/257; 204/263; 204/265
(58) Field of Classification Search .................. None
  See application file for complete search history.

(56) References Cited

U.S. PATENT DOCUMENTS 4,584,080 A    4/1986    Staab et al.
6,383,349 B1*    5/2002    Sakata et al. ................. 204/263

FOREIGN PATENT DOCUMENTS

EP    1 033 419    9/2000
WO    WO 01/57290    8/2001

* cited by examiner

*Primary Examiner*—Harry D Wilkins, III
(74) *Attorney, Agent, or Firm*—Charles A. Muserlian

(57) ABSTRACT

A distributing element for an electrolyte percolating-type electrochemical cell comprises an external feeding manifold and an assembly formed by a gas diffusion electrode, a percolator and optionally an on-exchange membrane. The element is particularly suitable for chlor-alkali electrolysis cells and alkaline fuel cells. It is also disclosed a method for retrofitting membrane electrochemical cells by inserting the distributing element of the invention therein.

21 Claims, 3 Drawing Sheets

DISTRIBUTING ELEMENT FOR ELECTROLYTE PERCOLATION ELECTROCHEMICAL CELL

This application is a 371 of PCT/EP03/05709 filed May 30, 2003.

DESCRIPTION OF THE INVENTION

Many industrial processes are carried out in electrochemical cells, such as chlor-alkali electrolysis for the production of chlorine gas and caustic soda or potash, water electrolysis primarily for the production of hydrogen, salt electrolysis to obtain the corresponding bases and acids, e.g. caustic soda and sulphuric acid from sodium sulphate, metal plating, among which principally copper and zinc. The congenital problem of all these process is the electric energy consumption, usually accounting for a substantial part of the total production cost. As the cost of electric energy shows a constant tendency to increase in all geographic areas, the importance of decreasing the electric energy consumption in the above indicated electrochemical processes is apparent.

The energy consumption of an electrochemical process primarily depends from cell voltage: the reason for the efforts directed to the improvement of cell design is therefore immediately evident, with the use of more catalytic electrodes and the reduction of the ohmic drops in the structure of the cell itself and in the electrolytes, for instance by decreasing the interelectrodic gap.

Reference will be mainly made hereafter to the chlor-alkali electrolysis process which undoubtedly holds a major industrial relevance, but it is understood that anything that will be discussed as state of the art and as improvement according to the indications of the present invention is definitely applicable also to the other electrochemical processes.

In the case of the conventional chlor-alkali process, a solution of sodium chloride, or less frequently potassium chloride, is supplied to a cell containing an anode, where chlorine gas is evolved, while at the cathode hydrogen is evolved with simultaneous formation of sodium hydroxide (caustic soda—potassium hydroxide, in case potassium chloride is supplied). In the most advanced kind of cell, the caustic soda present near the cathode is kept apart from the sodium chloride solution present in the anodic zone by means of a cationic membrane consisting of a perfluorinated polymer containing anionic groups, for example sulphonic and/or carboxylic groups. Such membranes are commercialised by several companies, e.g. DuPont/USA, Asahi Glass and Asahi Chemicals/Japan. As concerns this type of configuration, which is already very interesting under the energy consumption standpoint, many alternative proposals have however already been made, having in common the use of a gas diffusion electrode, specifically a cathode fed with pure oxygen or with an oxygen-containing mixture, by means of which the hydrogen evolution reaction is suppressed and oxygen reduction to water is accomplished in its place. The process is thereby depolarised, that is the electrolytic voltage is diminished to a significant extent. In the practice, it is observed that the voltage of a conventional cationic membrane cell supplied with a current density of 4 kA/m$^2$ is about 3 Volts, while that of a cell equipped with cationic membrane and oxygen cathode, working in the same operating conditions, is about 2-2.2 Volts. As it is apparent, an electric energy saving around 30% is achieved (the missed production of hydrogen, normally employed as fuel, is of secondary importance).

The use of gas electrodes for depolarising the electrochemical processes is obviously not limited to the use of cathodes for chlor-alkali electrolysis; processes are known, for example, for neutral salt splitting in the correspondent acid and base, particularly for the disposal of salts obtained as by-product of chemical processes, which make use of hydrogen-fed gas diffusion anodes, allowing the suppression of the oxygen evolution reaction. One embodiment of such kind is disclosed in U.S. Pat. No. 5,595,641. The use of gas diffusion electrodes for electrochemical applications is on the other hand neither limited to electrolytic processes in general, as it will suffice to mention their widespread use by now in the field of fuel cells. The difficult industrialisation of the electrochemical processes comprising gas diffusion electrodes is however perfectly exemplified by the case of chlor-alkali electrolysis, wherein the delicate structure of the cathode, consisting of a conductive porous support whereto a macroporous layer formed by an assembly of electrocatalytic particles mechanically stabilised by a binder is applied, is installed in big size or relatively tall cells, crossed by an upward flow of high density electrolyte. As a consequence, the resulting hydraulic head poses serious problems of flooding and thus of access of the oxygen to the catalytic sites. To be able to operate in these conditions with big size cells (indicatively of height exceeding 25-30 cm) it is therefore necessary to introduce devices allowing to break the hydraulic head associated to the liquid column. Among the different solutions proposed in the past, the only one which seems to solve the problem in an effective and economically viable manner consists of feeding a downward liquid flow through a percolator, for instance according to the disclosure in the International Patent Application WO 01/57290, entirely incorporated herein as reference. The percolator described in the aforementioned patent application consists of a planar porous element, contacting on one side the active surface of the gas diffusion electrode and on the other side the ion-exchange membrane, crossed by the electrolyte falling under the action of gravity; the percolator is designed so as to impose a controlled pressure drop to the falling electrolyte column, so that a resulting operative pressure not sufficient to flood the electrode is exerted on every point of the same. This solution, effective in principle, presents however some constructive problems, not discussed in the cited patent application. In particular, the simultaneous downward distribution of the electrolyte to the percolator and of oxygen to the gas diffusion cathode, also preferably from top to bottom, is not straightforward. The commonly adopted solution for feeding fluids in the conventional electrolysers with filter-press geometry, such as membrane chlor-alkali electrolysers, provides the use of internal distribution pipes placed in parallel to the cell walls. In the case of electrolysers provided with gas diffusion electrodes, the simultaneous feed of electrolyte and oxygen creates a twofold problem: on one hand the bulk of the two distribution pipes must be taken into account, on the other hand it is necessary to ensure the separation of the fluids in the region where the electrolyte distribution pipe crosses the gas diffusion electrode to reach the percolator, a point in which the sealing is rather critical. The problem of the design of a cell with percolator and gas diffusion electrode is even more serious in case it is required to adapt this novel technology to pre-existing membrane cells, conceived for the conventional non depolarised process. In this case, the cell has only one feeding duct to the cathode compartment, and the separate feeding of two fluids (electrolyte and oxygen) results nearly always impossible. The possibility of modifying a preexisting cell so as to adapt it to the energetically more favourable depolarised process thus remains a very considered need in the field of chlorine and soda industrial production.

Under a first aspect, it is an object of the present invention to provide a distributing element for feeding an electrolyte in an electrochemical cell provided with percolator and gas diffusion electrode, overcoming the limitations of the prior art.

Under another aspect, it is an object of the present invention to provide an assembly comprising a distributing element for feeding an electrolyte in an electrochemical cell which includes a percolator and a gas diffusion electrode, suitable to be inserted in a membrane electrochemical cell.

Under a further aspect, it is an object of the present invention to provide a method which permits to modify a membrane electrochemical cell of conventional design through the insertion of a distributing element comprising a percolator and a gas diffusion electrode.

Under a first aspect, the invention consists of a distributing element for an electrochemical cell, comprising an external feeding manifold, placed outside the external sealing flange of the cell, and an internal part in its turn comprising a gas diffusion electrode and a planar frame delimiting a percolator. Preferably, the percolator is inserted in a recess obtained in the planar frame. In one preferred embodiment, the distributing element of the invention comprises an upper external manifold for feeding the electrolyte, and a lower external manifold for discharging the same. The distributing element preferably comprises a sealing system toward the cell flange, for instance a set of planar gaskets. In one preferred embodiment, the element of the invention also comprises an ion-exchange membrane in contact with the surface of the percolator opposed to the one contacting the gas diffusion electrode. Any porous element, preferably having a planar geometry, suited to be crossed under the action of gravity by the downward electrolyte flow with a controlled pressure drop, can be used as the percolator. The percolator may thus consist of a plastic or metallic foam, of a planar mesh formed by the overlapping of planes of interwoven wires, of a profiled mesh, of a mattress formed by coils of wires, of an expanded sheet, of a sintered body, or again of combinations or juxtapositions of two or more of such elements. In general, the percolator preferably has hydrophobic characteristics, but also hydrophilic percolators are suited to the scope. The gas diffusion electrode may be a cathode supplied with a flow of oxygen, pure or in admixture, for instance as air or enriched air, or it may be an anode supplied with a hydrogen flow. In general, it is preferable that the distribution element be designed so as to allow the gas flow supplying the gas diffusion electrode to be directed downwards. The distributing element of the invention may be employed also in fuel cells, resulting particularly advantageous especially in the case of fuel cells with alkaline electrolyte, which has to be continuously recirculated as known to the experts of such field. To achieve such recirculation, the use of a percolator is particularly apt. In the case of alkaline fuel cells, the distributing element of the invention typically comprises two gas diffusion electrodes, one cathode fed with oxygen or air and one anode fed with a hydrogen-containing mixture, preferably with pure hydrogen, while the circulating electrolyte is a concentrated alkaline solution, preferably caustic potash. One of the two gas diffusion electrodes is in this case positioned, in its turn, in contact with the other face of the percolator, with a porous diaphragm or ion-exchange membrane optionally interposed therebetween.

Under a second aspect, the invention is directed to an electrochemical cell comprising a distributing element according to the previous description. The cell of the invention may be a cell for chlor-alkali electrolysis, for example a cell for chlorine/caustic soda electrolysis provided with an oxygen-fed gas diffusion cathode; the cell may as well be a cell for the electrolysis of neutral salts, and be for instance provided with a hydrogen-fed gas diffusion anode, or again an alkaline fuel cell provided with gas diffusion anode and cathode respectively fed with hydrogen and oxygen. In the case of electrolytic cells, the counterelectrode usually consists of a metallic porous element, for instance a mesh, a perforated or expanded sheet or other, and is preferably provided with a catalytic coating. In the case of a chlor-alkali cell, the catalytic coating serves to catalyse the evolution of chlorine. The gas diffusion cathode, the percolator and the ion-exchange membrane must be preferably pressed together, for example under the action of a pressure differential imparted between the anodic and the cathodic compartment of the cell, or by means of a mechanical element exerting a compression. A particularly suitable mechanical element consists for instance of an overlap of compressible and resilient layers formed by metal wires, for instance as described in the Italian Patent Application MI2001A 002538, inserted between the gas diffusion cathode and a cathodic mesh, or directly between the gas diffusion electrode and the cathodic wall of the cell; other mechanical elements, for example combinations of springs, are however equally suited to the scope. The cell of the invention is particularly suited to be employed in stacked structures according to a filter-press arrangement, for instance as modular element of electrolysers.

Under a further aspect, the invention consists of a method for retrofitting a membrane electrolytic cell of the prior art, provided with an ion-exchange membrane and with metallic gas evolving electrodes. According to one preferred embodiment, the method of the invention serves to retrofit a membrane chlor-alkali cell provided with a hydrogen evolving cathode and a chlorine evolving anode, so as to allow its utilisation as depolarised electrolysis cell, comprising an oxygen-fed gas diffusion cathode, suitable to suppress the hydrogen evolution reaction. The method consists of opening the original cell, removing the membrane and inserting the distributing element of the invention between the anodic and cathodic flange of the cell itself; along with the distributing element of the invention, it is preferable to insert also an elastic mechanical element capable of exerting a compression, for instance the element disclosed in MI2001A 002538, preferably between the gas diffusion cathode and the original metallic cathode which works, after the modification, as cathode current collector.

These and other aspects will be explained making use of the attached figures, which are provided as a mere exemplification, and which must not be intended as a limitation of the invention, whose domain is solely defined by the annexed claims.

Figure 1:
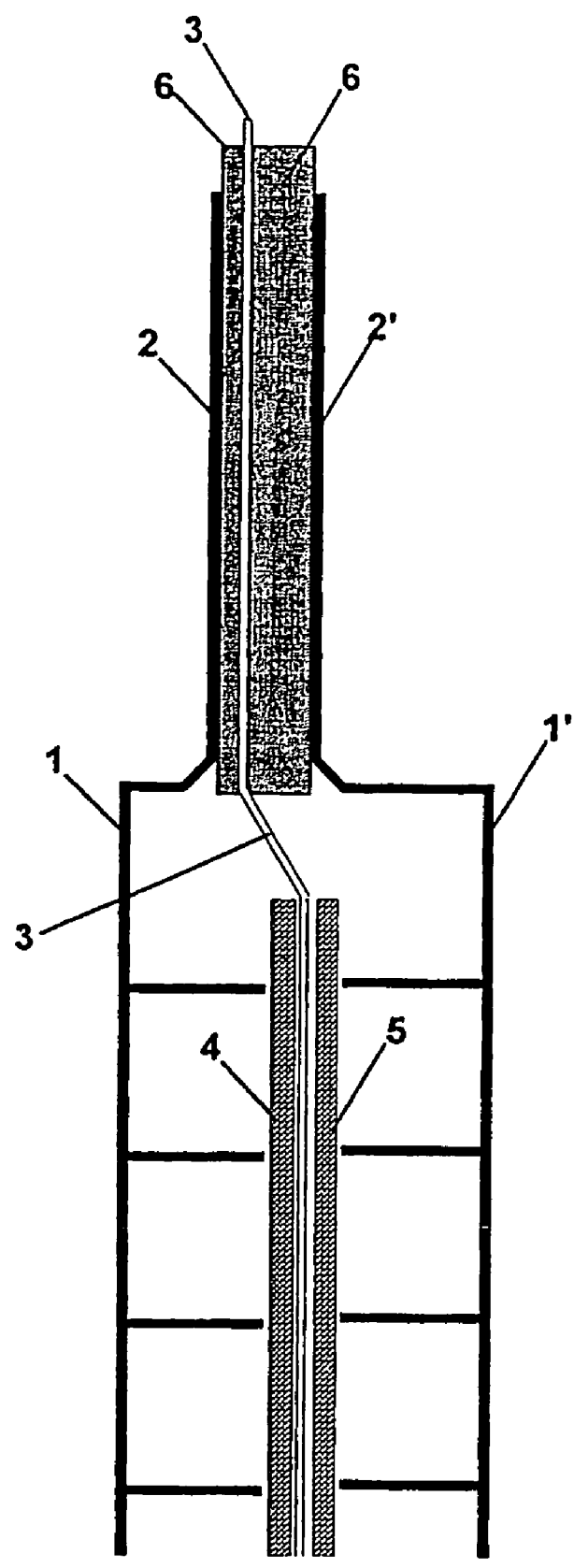
FIG. 1 shows a membrane electrochemical cell according to the prior art.

In FIG. 1, the perimetrical section of a generic electrolysis cell is shown, which for the sake of simplicity will be considered as a chlor-alkali cell; the cell structure is delimited by two conductive shells, an anodic shell (1), for instance of titanium, and a cathodic shell (1'), for instance of nickel. In the figure, planar shells provided with ribs for the transmission of electric current are shown, but several alternative configurations are possible. The shells terminate in their upper part with the sealing flanges (2) and (2'); the same happens in the lower part of the cell, not shown. An ion-exchange membrane (3) separates the anodic from the cathodic compartment. Inside the anodic compartment, the anode (4) is shown, which may be for instance a titanium mesh coated with a noble metal oxide-based catalyst. Inside the cathodic compartment, the cathode (5) is conversely shown, for instance a nickel mesh optionally activated with a catalyst. In the figure it is shown the anode in contact with the membrane and the cathode kept at a short distance thereto, but both electrodes can also be in contact with the membrane depending on considerations of ohmic and fluid-dynamic nature. The cell sealing in the peripheral flange zone is in this case guaranteed by flat-type gaskets (6), although the use of O-rings or other sealing elements is obviously possible. The cell is fed with sodium chloride brine at the anodic compartment, and chlorine evolution occurs on the anode (4); on the cathodic side, the caustic soda solution which constitutes the other reaction product is circulated, while hydrogen evolves at the cathode (5). The feeding and discharge ducts are not shown, but it is intended that they may be realised in many different ways. In the most common case, the cell of the figure is coupled to other equivalent in a filter-press configuration, and the feeding and discharge ducts consist of tubular elements.

Figure 2:
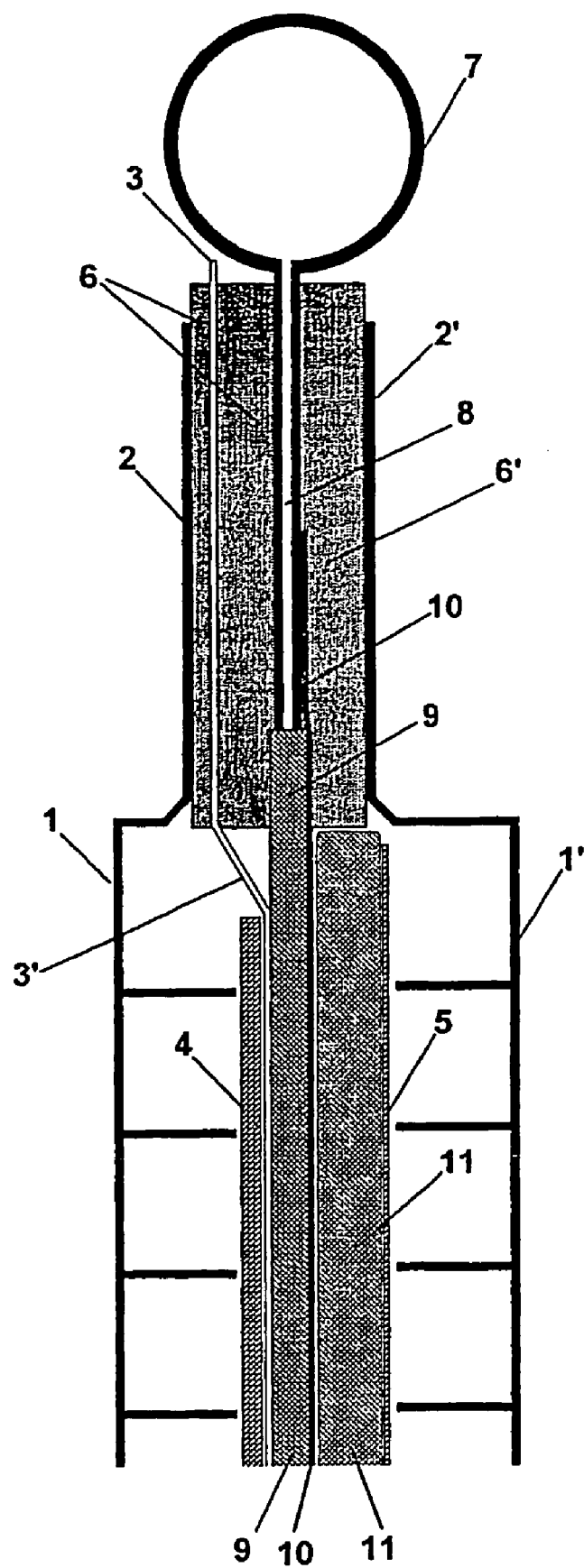
FIG. 2 shows a first embodiment of the distributing element of the invention.

FIG. 2 shows a cell of the invention, optionally obtained from the prior art cell of FIG. 1 by means of the method of the invention: all the distinctive elements of FIG. 1 are still present, except the original membrane (3); in place of the latter, a distributing element is present comprising an upper external feeding manifold (7), outside the zone of flange, and an internal part with a planar frame (8) delimiting a percolator (9) and a gas diffusion cathode (10) in contact with the percolator. In the case of chlor-alkali electrolysis, a new ion-exchange membrane (3') is present, in contact with the percolator (9); other applications, that make use of an undivided cell, omit the presence of this element. In one preferred embodiment, in the lower part of the cell an external caustic discharge manifold is present, not shown. The membrane percolator-gas diffusion electrode assembly may also include the elastic current collector (11) shown in the figure, which exerts a compression on one side onto the gas diffusion electrode/percolator/membrane package pushing it all against the anode (counterelectrode), and on the other side onto the original cathode (5), which assumes the role of cathode current collector. The elastic current collector may in other embodiments be omitted, and the electric continuity with the gas diffusion electrode (10) may be achieved in another way according to the prior art. In the embodiment of FIG. 2 the distributing element comprises also an optional additional gasket (6'), which may be clearly omitted when the sealing is effected according to alternative designs known in the art. FIG. 2 has been described making reference to the retrofitting of a pre-existing cell of the prior art according to the method of the invention, but it is completely evident that this constructive embodiment is valid also for brand new cells.

Figure 3:
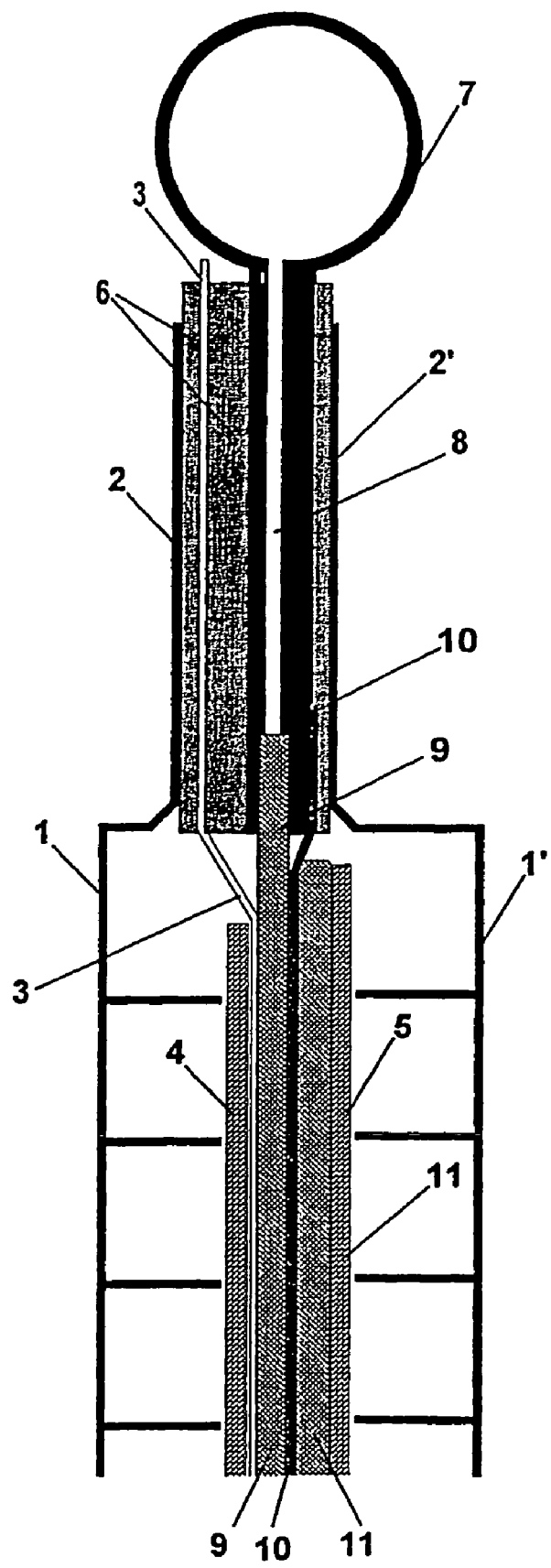
FIG. 3 shows a second embodiment of the distributing element of the invention.

In FIG. 3 an embodiment very similar to that of FIG. 2 is shown, the difference being that the terminal part of the planar frame (8) is provided with a recess to accommodate the peripheral part of the percolator (9); in an alternative embodiment, such recess may also accommodate the peripheral part of the gas diffusion electrode (10). In both embodiments of FIGS. 2 and 3, the circulating electrolyte on the cathode side, that is the product caustic soda solution, is fed through the upper external manifold (7) and circulated through the percolator (9) under the action of gravity. The feeding of oxygen to the gas diffusion electrode (10) may for instance be effected through the pre-existing cathode distribution pipe, not shown. Although those which are believed to be the best embodiments of the present invention have been described, it will be evident to the experts in the art that other variations and modifications may be introduced thereto without departing from the spirit and scope of the same.

The invention claimed is:

1. A distributing element suitable for insertion between the anodic and the cathodic flange of an electrolytic cell equipped with a hydrogen-evolving cathode and a chlorine-evolving anode thereby allowing the utilization of the electrolytic cell as a depolarised electrolysis cell, comprising an external upper electrolyte feeding manifold and an internal part, which internal part consists of:

one gas-diffusion electrode fed with a gas flow as the cathode of the cell at least one planar frame having a single recess, at the terminal part thereof and at least one percolator contacted with the gas-diffusion electrode, the peripheral part of the percolator being housed in said recess wherein an ion-exchange membrane is interposed between sais percolator and the anode of the electrochemical cell, both said percolator and the anode being contacted with the ion-exchange membrane.

2. The element of claim 1 further comprising an external lower electrolyte discharge manifold.

3. The element of claim 1 comprising sealing means toward the peripheral flange of the electrochemical cell.

4. The element of claim 3 wherein said sealing means consist of flat-type gaskets.

5. The element of claim 1 wherein said planar frame contains a recess suitable for housing the peripheral part of said percolator and optionally the peripheral part of said gas diffusion electrode.

6. The element of claim 1, comprising an ion-exchange membrane interposed between said percolator and a counterelectrode.

7. The element of claim 1 wherein said percolator is a planar porous element, suited to be crossed under the action of gravity by the flow of liquid electrolyte, selected from the group of foams, planar meshes formed by planes of interwoven and overlapped wires, planar meshes of woven wires, profiled meshes of wires, mattresses comprising coils of wires, expanded sheets, sintered bodies.

8. The element of claim 7 wherein said percolator is hydrophobic.

9. The element of claim 1 wherein said gas diffusion electrode is an anode and said gas flow comprises hydrogen.

10. The element of claim 1 wherein said gas diffusion electrode is a cathode and said gas flow comprises oxygen.

11. The element of claim 1 wherein said gas flow is fed from the top.

12. An electrochemical cell formed by an anodic compartment delimited by an anodic wall and a cathodic compartment delimited by a cathodic wall, comprising a distributing element of claim 1.

13. The cell of claim 12 wherein an ion-exchange membrane interposed between said percolator and said counterelectrode is pressed by imparting a pressure differential against said percolator, in its turn pressed against said gas diffusion electrode.

14. The cell of claim 12 wherein an ion-exchange membrane interposed between said percolator and said counterelectrode is pressed by elastic means against said percolator, in its turn pressed against said gas diffusion electrode.

15. The cell of claim 12 wherein said diffusion electrode is pressed by means of an elastic current collector against said percolator, in its turn pressed against a membrane, in its turn pressed against said counterelectrode.

16. The cell of claim 15 wherein said elastic current collector consists of an overlap of compressible and resilient layers formed by metallic wires.

17. The cell of claim 12 being selected from the group consisting of chlor-alkali electrolysis cells, hydrochloric acid electrolysis cells, electrolytic neutral salt splitting cells and fuel cells with alkaline electrolyte.

18. The cell of claim 12 being a cell for chlor-alkali electrolysis, wherein said gas diffusion electrode is a cathode fed with oxygen or oxygen-containing gas and said percolator element is crossed by a downward flow of caustics.

19. An electrolyzes comprising a multiplicity of cells of claim 12.

20. A method for retrofitting a membrane electrolytic cell equipped with a hydrogen evolving cathode and a chlorine evolving anode, provided with an anodic compartment and a cathodic compartment respectively delimited by an anodic wall and a cathodic wall and provided with respectively anodic and cathodic peripheral sealing flanges, comprising the removal of the original membrane and the insertion of a distributing element suitable for insertion between the anodic and the cathodic flange of an electrolytic equipped with a hydrogen-evolving cathode and a chlorine-evolving anode thereby allowing the utilization of the electrolytic cell as a depolarised electrolysis cell, comprising an external upper electrolyte feeding manifold and an internal part, which internal part consists of:

one gas-diffusion electrode fed with a gas flow as the cathode of the cell at least one planar frame having a single recess, at the terminal part thereof and at least one percolator contacted with the gas-diffusion electrode, the peripheral part of the percolator being housed in said recess wherein an ion-exchange membrane is interposed between sais percolator and the anode of the electrochemical cell, both said percolator and the anode being contacted with the ion-exchange membrane between the anodic and the cathodic flange.

21. The method of claim 20 comprising the further insertion of an elastic current collector so as to exert a compression force against said at least one gas diffusion electrode.

* * * * *